United States Patent [19]

Ruske et al.

[11] 4,213,757
[45] Jul. 22, 1980

[54] AQUEOUS DYE FORMULATIONS FOR CELLULOSE OR CELLULOSE-CONTAINING FIBERS

[75] Inventors: Manfred Ruske, Ludwigshafen; Wolfgang Elser, Wachenheim, both of Fed. Rep. of Germany

[73] Assignee: BASF Aktiengesellschaft, Fed. Rep. of Germany

[21] Appl. No.: 820,717

[22] Filed: Aug. 1, 1977

[30] Foreign Application Priority Data

Aug. 13, 1976 [DE] Fed. Rep. of Germany ....... 2636427

[51] Int. Cl.$^2$ .............................................. D06P 1/40
[52] U.S. Cl. ......................................... 8/518; 8/529; 8/602; 8/593; 8/661
[58] Field of Search .................... 8/1 XA, 82, 7, 54.2, 8/85 A, 93

[56] References Cited

U.S. PATENT DOCUMENTS

| 3,365,463 | 1/1968 | Groll | 260/314.5 |
| 4,000,158 | 12/1976 | von Tobel | 8/1 XA |

FOREIGN PATENT DOCUMENTS

| 2244262 | 3/1973 | Fed. Rep. of Germany. |
| 1010570 | 11/1965 | United Kingdom. |
| 1046520 | 10/1966 | United Kingdom. |
| 1322045 | 7/1973 | United Kingdom. |

OTHER PUBLICATIONS

Venkataraman, K., "The Chemistry of Synthetic Dyes," vol. V, (Academic Press), 1971, p. 262.
Colour Index, Third Edition, vol. 4, (Society of Dyers and Colourists), p. 4621, C. I. 74350.
Booth, G., "Phthalocyanines," in Venkataraman's "The Chemistry of Synthetic Dyes," vol. V (Academic Press, 1971), pp. 264–265.

*Primary Examiner*—A. Lionel Clingman
*Attorney, Agent, or Firm*—Keil & Witherspoon

[57] ABSTRACT

Aqueous dye formulations which contain one or more sparingly water-soluble, or water-insoluble, phthalocyanine-sulfonamides of the formula

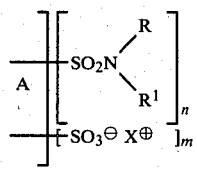

where A is a (n+m)-valent radical of copper phthalocyanine, cobalt phthalocyanine or nickel phthalocyanine which may be substituted by up to 4 chlorine or bromine atoms, R is hydrogen, alkyl of 1 to 5 carbon atoms or alkoxyalkyl of a total of 3 to 7 carbon atoms, R$^1$ is a substituted or unsubstituted aliphatic, cycloaliphatic, araliphatic or aromatic radical, or

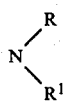

is a saturated 5-membered or 6-membered heterocyclic ring, X$^\oplus$ is H$^\oplus$, an alkali metal ion, (NH$_4$)$^\oplus$ or

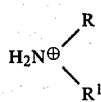

(where R and R$^1$ have the above meanings), n is 2, 3 or 4 and m is 0 or 1, together with one or more conventional dispersing agents and humectants and with or without a disinfectant. The formulations give very fast prints and dyeings on cellulose and on cellulose-containing fibers.

14 Claims, No Drawings

AQUEOUS DYE FORMULATIONS FOR CELLULOSE OR CELLULOSE-CONTAINING FIBERS

The present invention relates to aqueous dye formulations for dyeing cellulose or cellulose-containing fibers, which contain one or more sparingly water-insoluble phthalocyaninesulfonamides of the general formula

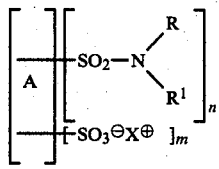

where A is a (m+n)-valent radical of copper phthalocyanine, cobalt phthalocyanine or nickel phthalocyanine which may be substituted by up to 4 chlorine or bromine atoms, R is hydrogen, alkyl of 1 to 5 carbon atoms or alkoxyalkyl of a total of 3 to 7 carbon atoms, $R^1$ is a substituted or unsubstituted aliphatic, cycloaliphatic, araliphatic or aromatic radical, or

is a saturated 5-membered or 6-membered heterocyclic ring, $X^\ominus$ is a hydrogen ion, an alkali metal ion, $(NH_4)^\oplus$ or an ammonium ion of the formula

where R and $R^1$ have the above meanings, n is 2, 3 or 4 and m is 0 or 1, together with one or more conventional dispersing agents and humectants and with or without a disinfectant.

Formulations comprising dyes of the formula I, where A is the radical of copper phthalocyanine (CuPc), are preferred.

The radical A may, on average, contain up to 4 chlorine or bromine atoms as further substituents. This means that the dye consists of a mixture with different A's, in which the individual A's may carry 0, 1, 2, 3 or 4 halogen atoms. Mixtures which on average contain from 0 to 2, especially from 0 to 0.7, chlorine atoms per radical A are preferred. The sulfonic acid radicals of A result from the process of manufacture. In general, the dye is a mixture which on average contains 0.5 or fewer, preferably fewer than 0.3, sulfonic acid groups per radical A.

When R is alkyl of 1 to 5 carbon atoms it may be, for example, methyl, ethyl, n-propyl, isopropyl, n-butyl, sec.-butyl, isobutyl, amyl and isoamyl. When R is alkoxyalkyl of 3 to 7 carbon atoms it may be, for example, 2-methoxyethyl, 2-ethoxyethyl, 2-propoxyethyl, 2-isopropoxyethyl, 2-butoxyethyl, 3-methoxypropyl, 3-ethoxypropyl, 3-propoxypropyl, 3-isopropoxypropyl and 3-butoxypropyl. Preferably, R is hydrogen.

When $R^1$ is an optionally substituted aliphatic radical, it may be:
(a) linear or branched saturated alkyl of 1 to 8 carbon atoms,
(b) alkoxyalkyl of a total of 3 to 11 carbon atoms,
(c) phenoxyalkyl, where alkyl is of 2 or 3 carbon atoms,
(d) phenoxyalkoxyalkyl where alkoxyalkyl is of 4 to 6 carbon atoms and
(e) alkyl which carries a saturated 5-membered or 6-membered O-containing heterocyclic ring or a cycloaliphatic radical of 8 to 12 carbon atoms as a substituent.

Where $R^1$ is a cycloaliphatic radical, it may be a cycloaliphatic radical of 6 to 13 carbon atoms comprising 5-membered to 12-membered rings, in which the 6-membered and 5-membered rings may be fused to one or more 6-membered or 5-membered other saturated rings.

When $R^1$ is an araliphatic or aromatic radical it may be, for example, phenalkyl of 7 to 10 carbon atoms, phenyl, or phenyl with from 1 to 3 substituents from amongst alkyl of 1 to 4 carbon atoms, methoxy, ethoxy, chlorine or bromine, the substituents being identical or different.

Specific examples of substituents for $R^1$ are:
(a) alkyl of 1 to 8 carbon atoms: the radicals mentioned as meanings of R, as well as 1,1-dimethylpropyl, 2,2-dimethylpropyl (neopentyl), n-pentyl, 2-methylbutyl, sec.-pentyl, methylpentyl, dimethylbutyl, dimethylpentyl, n-octyl, 2-ethylhexyl and 1,5-dimethylhexyl;
(b) alkoxyalkyl: 2-methoxyethyl, 2-ethoxyethyl, 2-isopropoxyethyl, 2-butoxyethyl, 2-isobutoxyethyl, 3-methoxypropyl, 3-ethoxypropyl, 3-isopropoxypropyl, 3-butoxypropyl, 3-isobutoxypropyl, 2-(2'-ethylhexoxy)-ethyl and 2-(2'-ethylhexoxy)-propyl;
(c) and (d) phenoxyalkyl and phenoxyalkoxyalkyl: 2-phenoxyethyl, 3-phenoxypropyl, 2-(phenoxyethoxy)-ethyl and 3-(phenoxyethoxy)-propyl;
(e) alkyl substituted by saturated oxygen-containing heterocyclic radicals or cycloaliphatic radicals: (tetrahydrofuranyl-2)-methyl, (4-methyl-tetrahydropyranyl-3)-methyl and

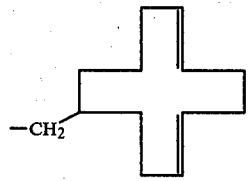

(cyclododecane-dienyl-methyl)

(f) cycloaliphatic radicals: cyclohexyl, cycloheptyl, cyclooctyl or a radical of one of the formulae

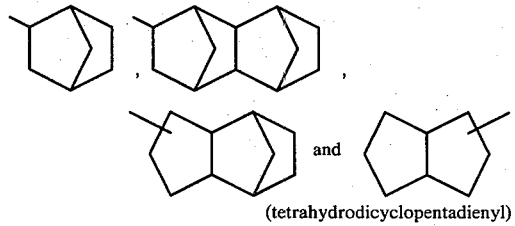

(tetrahydrodicyclopentadienyl)

(g) phenalkyl and unsubstituted or substituted phenyl: benzyl, β-phenylethyl, β-phenylpropyl, γ-phenylpropyl, γ-phenylbutyl and δ-phenylbutyl; phenyl, 2-tolyl, 4-tolyl, 3-tolyl, 4-ethylphenyl, 2,4-dimethylphenyl, 3,5-dimethylphenyl, 4-butylphenyl, 4-sec.-butylphenyl, 4-tert.-butylphenyl, 4-isopropylphenyl, 2,4,6-trimethylphenyl, 2-chlorophenyl, 4-chlorophenyl, 4-bromophenyl, 2-methyl-4-chlorophenyl, 4-methoxyphenyl, 4-ethoxyphenyl and 2,4-dimethoxyphenyl.

When

is a radical of a saturated heterocyclic ring it may be, for example, the radical of pyrrolidine, morpholine, thiomorpholine, piperidine, piperazine, N-methylpiperazine or N-ethylpiperazine.

Amongst the dyes of the formula I, those where R is hydrogen and $R^1$ is alkoxyethyl or alkoxypropyl, alkoxy being of 1 to 8 carbon atoms, are preferred because of their technological and tinctorial properties, eg. depth of color, wet fastness, light fastness, and matching hues of cotton-polyester union fabric. Amongst these, the dyes (I) where alkoxy is of 1 to 5 carbon atoms are particularly preferred. n is in both cases 2, 3 or 4. The dyes of the formula I are as a rule mixtures of dyes with 2, 3 or 4 sulfonamide radicals. In general, the number of sulfonamide groups in the mixture is on average from 2.3 to 3.2, preferably from 2.5 to 3 per molecule of dye.

Accordingly, preferred dyes of the formula I are those where R is H, $R^1$ is 2-methoxyethyl, 2-ethoxyethyl, 2-propoxyethyl, 2-isopropoxyethyl, 2-butoxyethyl, 2-(2′-ethylhexoxy)-ethyl, 3-methoxypropyl, 3-ethoxypropyl, 3-propoxypropyl, 3-isopropoxypropyl, 3-butoxypropyl or 3-(2′-ethylhexoxy)-propyl, $X^\oplus$ is an ammonium ion of the formula

where R is H and $R^1$ has the above meaning, n has an average value of from 2.3 to 3.2 and m an average value of 0.5 or less.

The formulations according to the invention are advantageously prepared by suspending the dye, in the form of its press cake, in water, in the presence or absence of from 2 to 10% by weight (based on the dye) of an anionic dispersing agent, and heating the suspension, eg. by stirring it for from 2 to 20 hours at from 50° to 95° C. and preferably from 70° to 85° C. After adding the requisite amount of dispersing agent and humectant, with or without a disinfectant, the suspension is dispersed in a stirred ball mill, a sand mill or a bead mill, until the dye particle size is about 0.5 μm. Storage-stable formulations are thus obtained. The formulations according to the invention preferably contain from 8 to 12% by weight of the finely dispersed dye, from 3 to 6% by weight of dispersing agent and from 5 to 20, preferably from 8 to 15, % by weight of humectant, with or without up to 1, preferably from 0.2 to 1, % by weight of disinfectant (based on the formulation).

Preferred dispersing agents are non-ionic dispersing agents, above all ethylene oxide adducts and propylene oxide/ethylene oxide adducts of aromatic or, preferably, aliphatic, diamines and polyamines. Such dispersing agents are described, for example, in U.S. Pat. Nos. 2,979,528 and 3,841,888.

Furthermore, anionic dispersing agents may above all be used as additives. Examples are ligninsulfonates, salts of phenol/formaldehyde/sodium sulfite condensation products (German Laid-Open Application DOS No. 2,301,638), salts of 2-naphthalenesulfonic acid/formaldehyde condensation products, salts of phenolsulfonic acid/urea/formaldehyde condensation products, and salts of phenolsulfonic acid/urea/formaldehyde condensation products which have been post-condensed with phenol and formaldehyde. The condensation products of 2-naphthalenesulfonic acid with formaldehyde are particularly preferred. The amount of anionic dispersing agent is up to 10%, based on the total amount of dispersing agents.

The amount of non-ionic dispersing agent is from 25 to 70%, preferably from 35 to 50%, based on the dye.

Suitable humectants are, above all, glycols, eg. ethylene glycol, propylene glycol, diethylene glycol and, preferably, dipropylene glycol.

The dyes of the formula I are manufactured in the conventional manner by reacting sulfonic acid chlorides of the formula

with at least n moles of amines of the formula

in an aqueous medium at from 0° to 80° C., preferably at from 0° to 25° C., in the presence of alkaline agents.

The amount of the amine (III) is preferably from 1.1 to 4 times the stoichiometrically required amount.

Since, in the course of the reaction of the sulfonic acid chloride groups, hydrolysis of the —SO₂Cl groups may also occur as a side reaction, this process also results in, inter alia, sulfonamides which may carry a sulfonic acid group. As a rule, mixtures which on average contain fewer than 0.5, preferably fewer than 0.3, sulfonic acid groups per molecule of phthalocyanine are obtained.

The sulfonic acid chlorides (II) are manufactured by conventional processes, eg. by sulfonating $A(H)_{n+m}$ and converting the product to the sulfonic acid chlorides (II), by chlorosulfonating $A(H)_{n+m}$, by synthesis from 3-sulfophthalic acid or 4-sulfophthalic acid or the corresponding sulfonic acids of the phthalic acid derivatives together with phthalic acid, chlorophthalic acid or its anhydrides and/or imides, and subsequent conversion of the sulfonic acid groups to the sulfonic acid chloride groups by means of phosphorus pentachloride, thionyl chloride or chlorosulfonic acid.

The dyes of the formula I differ from the phthalocyanine pigments in that the former are sparingly soluble in water and in organic media. However, the dyes (I) are much more sparingly soluble than the soluble phthalocyanine dyes and cannot be used for dyeing fibers from an aqueous liquor.

However, German Pat. No. 1,811,796 discloses a process which permits printing water-insoluble dyes onto cellulose or cellulose-containing textiles. The general sense of the information on process conditions given in the said patent also applies to the dye formulations of the present invention.

Further, German Laid-Open Applications DOS Nos. 2,524,243 and 2,528,743 disclose further processes by means of which the dye formulations of the invention may be applied. Printing processes are preferred.

The dye formulations of the invention give dyeings and prints having very good fastness properties, amongst which the wet fastness, crocking fastness, dry-cleaning fastness and light fastness should be singled out. When the print is washed, there is no staining of any white ground which may be present.

Dyes of the formula I also give adequately deep and fast dyeings on polyester fibers. The hue of these is a good match to the hue of the dyeings obtained on cellulose. This is a substantial advantage over the turquoise-blue dyes from the 1,4-diaminoanthraquinone-2,3-dicarboximide series disclosed in U.S. Pat. Nos. 3,835,154 and 3,835,155. The latter dyes give a noticeably redder hue on cellulose than on polyester.

In the Examples which follow, parts and percentages are by weight, unless stated otherwise.
CuPc = the radical of copper phthalocyanine
NiPc = the radical of nickel phthalocyanine
CoPc = the radical of cobalt phthalocyanine.

EXAMPLE 1

(a) A polyester/cotton union fabric (weight ratio 67:33) is printed with a paste which comprises 5 parts of the dye of the formula

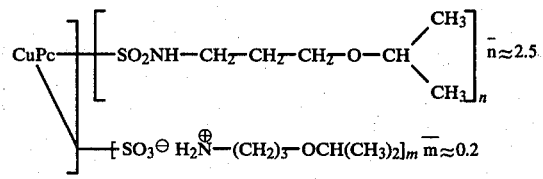

in the form of a 10% strength formulation (see (c)), 120 parts of the reaction product of polyethylene oxide of molecular weight 300 with boric acid in the molar ratio of 3:1, 600 parts of a 10% strength alginate thickener and 230 parts of water. The print is dried at 150° C. and is heated for 6 minutes at 180° C. by means of live steam. It is then rinsed with cold water, soaped at 80° C., rinsed cold and dried. A lightfast and washfast brilliant turquoise blue print on a white ground is obtained.

(b) The dye used in (a) is manufactured as follows: 33.5 parts of copper phthalocyanine-sulfochloride, containing an average of 2.5 sulfochloride groups, are suspended, in the form of the freshly obtained water-containing press cake, in 200 parts of ice and 200 parts of water, and the suspension is brought to pH 7.0 at 0° C. by means of 10% strength ammonia. After adding 10 g of sodium acetate, 35.1 parts of isopropoxypropylamine are added dropwise over 30 minutes and the mixture is stirred for one hour at from 0° to 5° C. The reaction mixture is then allowed to come to 20° C. in the course of 5 hours and is stirred for 18 hours at room temperature. The reaction mixture is heated to 55°–60° C. by adding warm water, and is filtered off. The filter residue is washed neutral, and until the filtrate is colorless, by means of water at 50° C. After drying, 48 parts of a blue powder of the formula

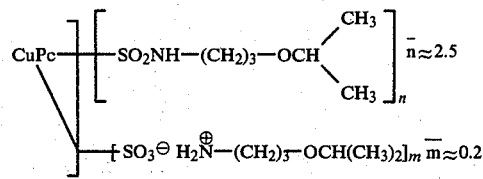

are obtained.

| | For $C_{50}H_{58}N_{11}O_9S_3Cu$ (M ≙ 1112.5 (= n = 3) and $C_{44}H_{45}N_{10}O_6S_2Cu$ (M ≙ 933.5 (= n = 2) the following figures are calculated | | | | | |
|---|---|---|---|---|---|---|
| | (n = 3) | 13.8% | N | 8.6% | S | |
| | (n = 2) | 15.0% | | 6.8% | | |
| found | | 14.0% | | 7.8% | | | ie. the approximate mean value of n is 2.5.

(c) The dye obtained as described in (b) is converted to an aqueous dye formulation as follows:

10 parts of dye 1 (b), 70 parts of water, 10 parts of dipropylene glycol and 0.5 part of the sodium salt of a condensation product of β-naphthalenesulfonic acid and formaldehyde are stirred for 5 hours at from 80° to 85° C. 4 parts of a non-ionic dispersing agent obtained by the addition reaction of 28 moles of propylene oxide with ethylenediamine, followed by the addition reaction of 34 moles of ethylene oxide, are then added and the mixture is milled in a sand mill until the particle size is about b 0.5 μm. 0.5 part of pentachlorophenol is then added and the dye content of the formulation is brought to 10% (based on the formulation) by adding water. A storage-stable formulation is obtained.

If the above dye is replaced by an equal amount of one of the dyes shown in the Table which follows, turquoise blue dyes having virtually the same fastness properties are obtained. Mixtures of the dyes shown in the Table may also be used. The dyes are manufactured by a method similar to that described in Example 1 (b) and converted to dye formulations by a method similar to 1 (c).

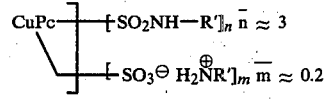

| Example | R' | Content of N % | Content of S % | Hue of the print |
|---|---|---|---|---|
| 2 | —CH₂—CH₂—O—CH₃ | 15.4 | 8.4 | brilliant turquoise blue |
| 3 | —CH₂—CH₂—O—CH₂—CH₃ | 14.6 | 9.1 | brilliant turquoise blue |
| 4 | —CH₂—CH₂—CH₂—O—CH₃ | 15.0 | 8.3 | brilliant turquoise blue |
| 5 | —⟨⟩—OCH₃ | 13.8 | 7.9 | greenish turquoise blue |
| 6 | —CH(CH₃)₂ | 15.7 | 9.1 | brilliant turquoise blue |
| 7 | —CH₂—CH₂—CH₃ | 16.0 | 8.3 | brilliant turquoise |

-continued

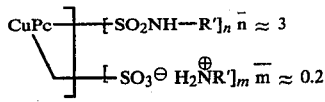

| Example | R' | Content of Hue of the print | | |
|---|---|---|---|---|
| | | N % | S % | |
| 8 | —C$_4$H$_9$(n) | 15.5 | 7.7 | blue brilliant turquoise blue |
| 9 | (norbornyl group) | 12.1 | 7.1 | brilliant turquoise blue |
| 10 | —CH$_2$—(phenyl) | 14.3 | 8.0 | brilliant turquoise blue |
| 11 | —CH$_2$—CH$_2$—CH$_2$—(phenyl) | 13.2 | 7.8 | brilliant turquoise blue |
| 12 | —CH$_2$—(adamantyl) | 11.2 | 6.1 | brilliant turquoise blue |

EXAMPLE 13

A cotton fabric is printed, by rotary screen printing, with an ink comprising 10 parts of the dye of the formula

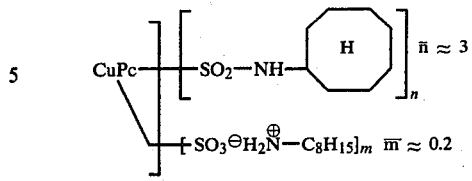

in the form of a 10% strength aqueous formulation, 100 parts of polyethylene oxide of molecular weight 300 and 800 parts of a 3% strength alginate thickener, and the print is dried at 100° C. It is then heated for 1 minute at 200° C. by means of hot air, after which it is rinsed cold, soaped at the boil, again rinsed cold and dried. A washfast turquoise print on a white ground is obtained.

The dye used in (a) is manufactured by a method similar to that described in Example 1 (b), the isopropoxy-propylamine being replaced by an equimolar amount of cyclooctylamine.

The dye obtained is converted to a 10% strength aqueous formulation by a method similar to that described in 1 (c).

If the dye of Example 13 is replaced by an equal amount of a formulation of one of the dyes shown in the Table which follows, dyeings with comparable fastness properties are obtained.

The dyes of Examples 14 to 23 are manufactured by a method similar to that described in Example 1 (b) and converted to an aqueous formulation by a method similar to that described in 1 (c).

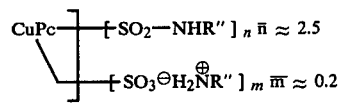

| Example | R'' | Hue |
|---|---|---|
| 14 | —CH$_3$ | turquoise blue |
| 15 | —CH$_2$—CH$_3$ | turquoise blue |
| 16 | —CH$_2$—CH$_2$—(phenyl) | turquoise blue |
| 17 | —CH$_2$—(tetrahydrofuranyl) | turquoise blue |
| 18 | —(cyclohexyl) | turquoise blue |
| 19 | —CH$_2$—CH$_2$—CH$_2$—O—CH$_2$—CH(C$_2$H$_5$)—C$_4$H$_9$(n) | turquoise blue |
| 20 | —CH$_2$—CH$_2$—CH$_2$—O—CH$_2$—CH$_2$—O—(phenyl) | turquoise blue |
| 21 | —(phenyl)—CH$_3$ | greenish turquoise |

-continued

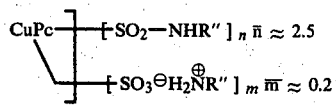

| Example | R″ | Hue |
|---|---|---|
| 22 | (2,4,5-trimethylphenyl) | turquoise blue |
| 23 | $-CH_2-CH_2-O-CH_2-CH(C_2H_5)-C_4H_9(n)$ | turquoise blue |

EXAMPLE 24

(a) A polyester/cellulose union fabric (weight ratio 67:33) is printed, on a screen machine, with an ink which comprises 30 parts of the dye of the formula

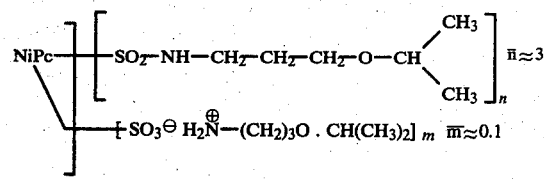

100 parts of the reaction product of polyethylene oxide of molecular weight 300 with boric acid in the molar ratio of 3:1, 30 parts of oleic acid diethanolamide and 840 parts of a 3% strength alginate thickener, and the print is dried at 110° C.

The print is then fixed by means of superheated steam at 185° C. in 5 minutes and is finished as described in Example 10. A very clear turquoise fast print on a white ground is obtained.

The dye used in (a) is manufactured by the method described in Example 1 (b), the CuPc sulfochloride being replaced by the equivalent amount of NiPc$+SO_2Cl]_{n+m}$, where $\bar{m}+\bar{n}\approx 3.1$. The dye obtained is then converted to a formulation by a method similar to that described in Example 1 (c).

EXAMPLE 25

(a) If the dye described in Example 1 is replaced by an equal amount of a cobalt phthalocyanine of the formula

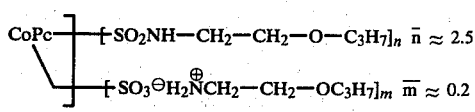

in the form of a formulation, a turquoise blue print with good fastness properties is obtained.

(b) The dye used in (a) is manufactured by a method similar to that described in Example 1 (b), replacing the CuPc-sulfonic acid chloride by the equivalent amount of [CoPc]$(SO_2Cl)_{n+m}$, where $\bar{n}+\bar{m}\approx 2.7$. The dye is then converted to a fluid formulation as described in Example 1 (c).

EXAMPLE 26

(a) The procedure described in Example 1 (a) is followed except that the same amount of

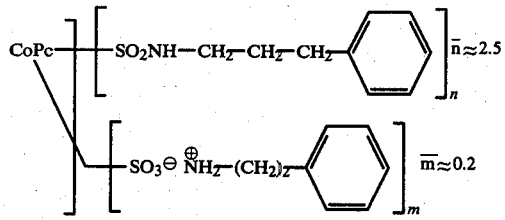

is used as the dye. Turquoise blue prints with good fastness properties are obtained.

The dye is manufactured by a method similar to that described in Example 1 (b) and is converted to a fluid formulation by a method similar to that described in Example 1 (c).

EXAMPLE 27

(a) The procedure described in Example 1 (a) is followed, but instead of the dye described there, an equal amount of the dye of the formula

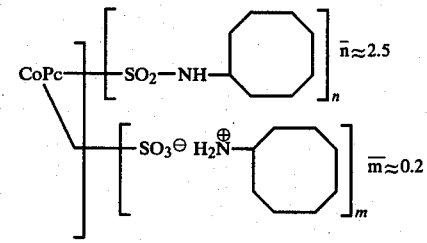

in the form of a 10% strength aqueous formulation is used. Turquoise blue prints which have good fastness properties are obtained.

(b) The dye is manufactured by a method similar to that described in Example 1 (b), replacing the CuPc-sulfonic acid chloride by the equivalent amount of [CoPc$+(SO_2Cl)_{m+n}$, where $\bar{m}+\bar{n}\approx 2.7$. The dye is then converted to the fluid formulation by a method similar to that described in Example 1 (c).

EXAMPLE 28

(a) The procedure described in Example 1 (a) is followed, but the dye described there is replaced by an equal amount of a fluid formulation of the dye of the formula

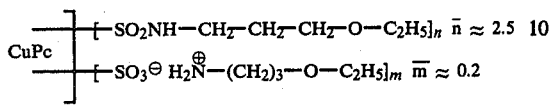

A lightfast and washfast, very deep turquoise blue print on a white ground is obtained.

(b) The dye is manufactured as follows:

494 parts of copper phthalocyanine-sulfochloride, containing an average of 2.5 sulfochloride groups, are suspended in 5,200 parts of an ice/water mixture. The suspension is brought to pH 6.0 with 25% strength ammonia. After adding 440 parts of 3-ethoxypropylamine, the mixture is stirred for one hour at from 0° to 5° C. The reaction mixture is then brought to 50° C. in the course of 2 hours and stirred at this temperature for 3 hours. 3,000 parts of warm water are then added and the precipitate is filtered off. The filter residue is washed neutral, and until the filtrate is colorless, by means of warm water. The press cake contains 570 parts of dye of the stated formula. The dye contains 14.6% of N and 8.0% of S.

(c) The dye obtained as described in (b) is converted to a 10% strength aqueous formulation by a method similar to that described in Example 1 (c).

We claim:

1. An aqueous dye formulation for dyeing cellulose or cellulose-containing fibers, which contains a mixture of sparingly water-soluble, or water-insoluble, phthalocyaninesulfonamides of the formula

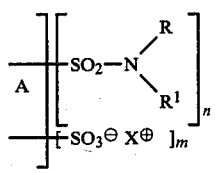

where A is a (m+n)-valent radical of copper phthalocyanine, cobalt phthalocyanine or nickel phthalocyanine which may be substituted by up to 4 chlorine or bromine atoms, R is hydrogen, alkyl of 1 to 5 carbon atoms or alkoxyalkyl of a total of 3 to 7 carbon atoms, $R^1$ is alkoxyethyl or alkoxypropyl, the alkoxy being of 1 to 8 carbon atoms, or

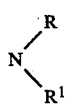

is a saturated 5-membered or 6-membered heterocyclic ring, $X^{\oplus}$ is a hydrogen ion, an alkali metal ion, $(NH_4)^{\oplus}$ or an ammonium ion of the formula

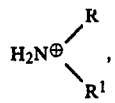

where R and $R^1$ have the above meanings, n is 2, 3 or 4 and m is 0 or 1, A on average containing 0.5 or fewer sulfonic acid groups, together with one or more dispersing agents and humectants.

2. An aqueous dye formulation for dyeing cellulose or cellulose-containing fibers, which contain a mixture of sparingly water-soluble, or water-insoluble, phthalocyaninesulfonamides of the formula

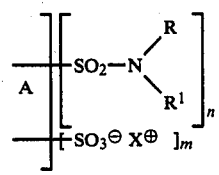

where A is a (m+n)-valent radical of copper phthalocyanine, cobalt phthalocyanine or nickel phthalocyanine which may be substituted by up to 4 chlorine or bromine atoms, R is hydrogen, $R^1$ is alkoxyethyl or alkoxypropyl, alkoxy being of 1 to 8 carbon atoms, $X^{\oplus}$ is a hydrogen ion, an alkali metal ion, $(NH_4)^{\oplus}$ or

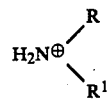

where R and $R^1$ have the above meanings, n is 2, 3 or 4 and m is 0 or 1, A on average containing 0.5 or fewer sulfonic acid groups together with one or more dispersing agents and humectants.

3. A dye formulation as claimed in claim 2, in which $R^1$ in the formula is alkoxyethyl or alkoxypropyl, alkoxy being of 1 to 5 carbon atoms.

4. A dye formulation as claimed in claim 2, in which n has an average value of from 2.3 to 3.2 and m an average value of 0.5 or less.

5. A dye formulation as claimed in claim 4, in which n has an average value of from 2.5 to 3 and m an average value of 0.3 or less.

6. An aqueous dye formulation as claimed in claim 2, which contains, based on the formulation, from 8 to 12% by weight of finely dispersed dye, from 3 to 6% by weight of dispersing agent, from 5 to 20% by weight of humectant and up to 1% by weight of disinfectant.

7. An aqueous dye formulation as claimed in claim 2, which contains, as the dispersing agent, a propylene oxide/ethylene oxide adduct of a diamine or polyamine and up to 10% by weight, based on the non-ionic dispersing agent, of an anionic dispersing agent.

8. An aqueous dye formulation as claimed in claim 2, which contains ethylene glycol, propylene glycol, diethylene glycol or dipropylene glycol as the humectant.

9. An aqueous dye formulation as claimed in claim 6, which contains, as the dispersing agent, a propylene oxide/ethylene oxide adduct of a diamine or polyamine and up to 10% by weight, based on the non-ionic dispersing agent, of an anionic dispersing agent.

10. An aqueous dye formulation as claimed in claim 6, which contains ethylene glycol, propylene glycol, diethylene glycol or dipropylene glycol as the humectant.

11. An aqueous dye formulation for dyeing cellulose or cellulose-containing fibers, which contains, based on the formulation, (a) from 8 to 12% by weight of a mixture of finely dispersed dyes of the formula

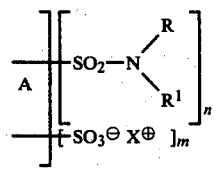

where A is a (m+n)-valent radical of copper phthalocyanine, nickel, phthalocyanine or cobalt phthalocyanine, $R^1$ is alkoxyethyl or alkoxypropyl, alkoxy being of 1 to 5 carbon atoms, $X^\oplus$ is a hydrogen ion, an alkali metal ion, $(NH_4)^\oplus$ or $H_3N^\oplus R^1$, where $R^1$ has the above meaning, n is 2, 3 or 4 and m is 0 or 1, A on average containing 0.5 or fewer sulfonic acid groups, (b) from 3 to 6% by weight of a dispersing agent based on a propylene oxide/ethylene oxide adduct of an aromatic or aliphatic diamine or polyamine, and up to 10% by weight, based on the adduct, of an anionic dispersing agent, (c) from 5 to 20% by weight of ethylene glycol, propylene glycol, diethylene glycol or dipropylene glycol as a humectant and (d) from 0 to 1% by weight of a disinfectant.

12. A dye formulation as claimed in claim 1 wherein A on average contains fewer than 0.3 sulfonic acid groups.

13. A dye formulation as claimed in claim 2 wherein A on average contains fewer than 0.3 sulfonic acid groups.

14. A dye formulation as claimed in claim 11 wherein A on average contains fewer than 0.3 sulfonic acid groups.

* * * * *